Aug. 29, 1950     C. B. MOORE     2,520,468
PNEUMATIC CONTROL APPARATUS
Filed Sept. 29, 1943     2 Sheets—Sheet 1
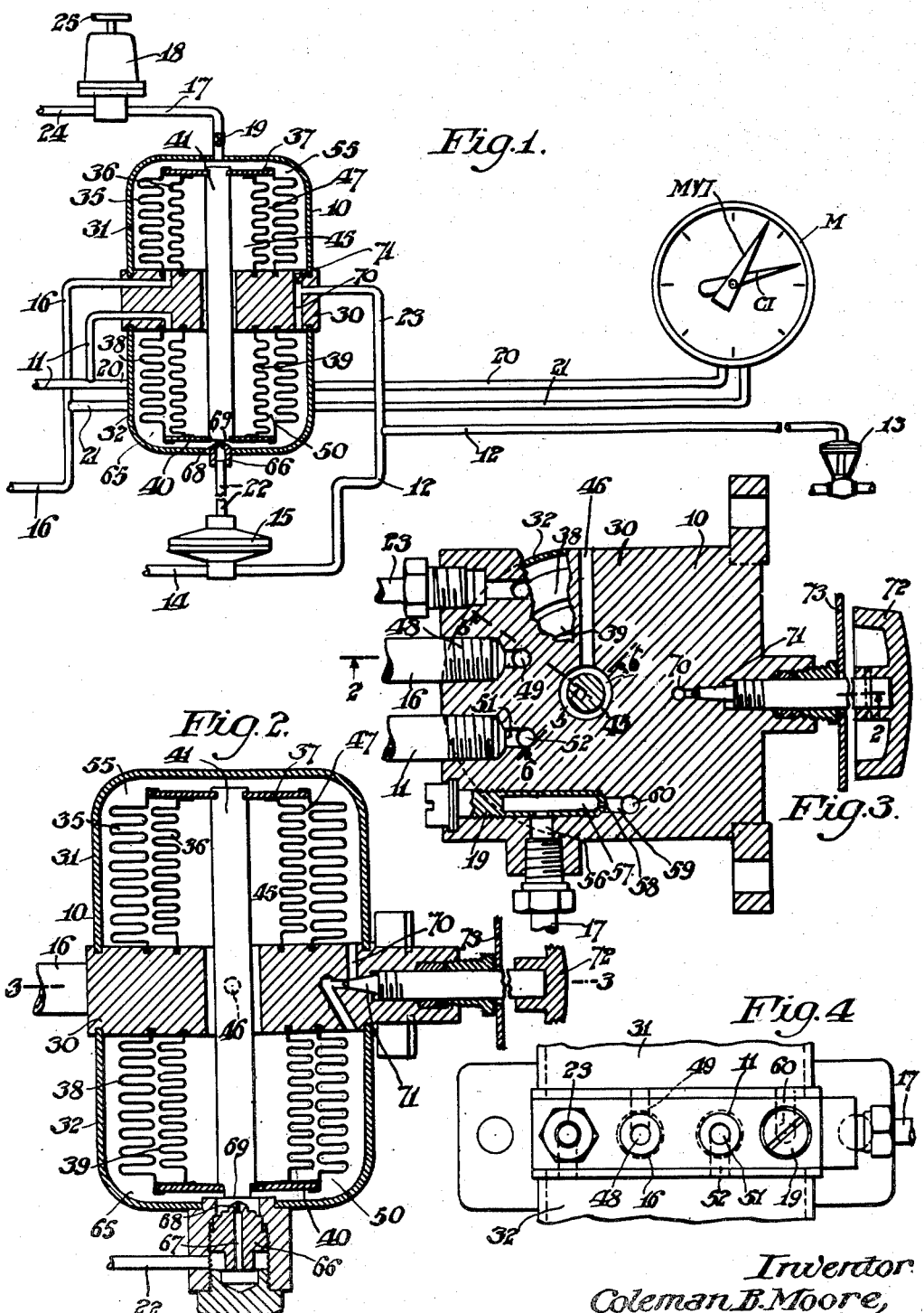
Inventor
Coleman B. Moore,
By J. T. Wolvermuth
Attorney.

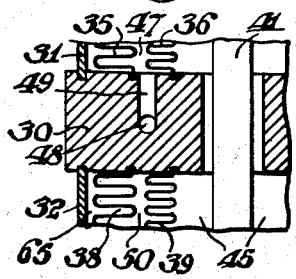
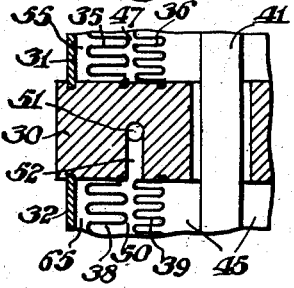
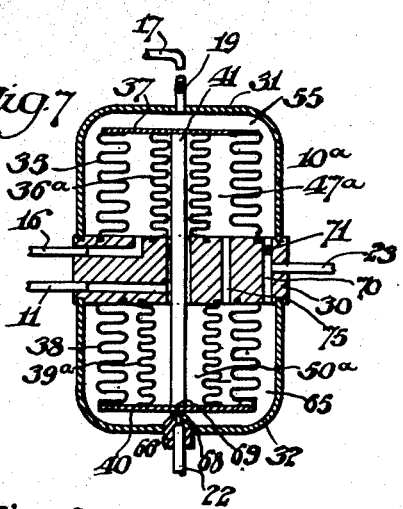
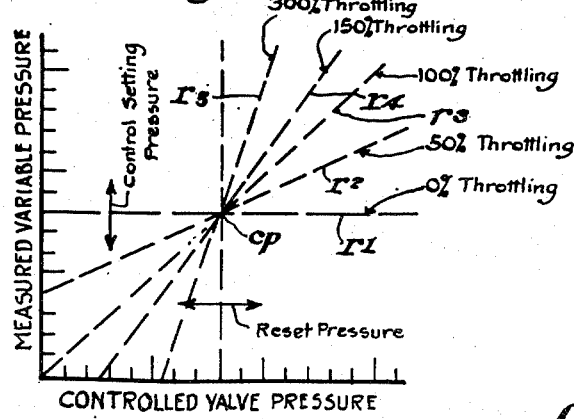

Patented Aug. 29, 1950

2,520,468

UNITED STATES PATENT OFFICE 2,520,468

PNEUMATIC CONTROL APPARATUS

Coleman B. Moore, Carroll Park, Pa., assignor to Moore Products Co., Philadelphia, Pa., a copartnership Application September 29, 1943, Serial No. 504,258

17 Claims. (Cl. 137—153)

1

This invention relates to pneumatic control apparatus and more particularly to controllers for use in connection therewith for operating or effecting the operation of controlled elements such as valves and the like in accordance with changes in a measured variable control condition, such as pressure, temperature, flow or liquid level.

In the conventional types of controllers heretofore available resort was had to complex systems of links and levers for securing the desired adjustments or changes of throttling range or sensitivity and of the control setting. This introduced friction with lack of accuracy in setting and in response. In the conventional types of controllers heretofore available, also, the number of moving parts was excessive.

In accordance with the present invention a controller is provided in which pneumatically operated parts are utilized in a frictionless manner, in which relatively few parts are employed, and in which the pressure sensitive elements, at equilibrium conditions, are rebalanced substantially at their initial positions. In accordance with the present invention, also, a controller is provided in which the resultant of various forces is utilized and a counter force set up thereby. All this is accomplished without the necessity for using links, levers, pivots, and the like.

The nature and characteristic features of the invention will be more readily understood from the following description, taken in connection with the accompanying drawings forming part hereof, in which:

Figure 1 is a diagrammatic view of a pneumatic circuit in which a controller in accordance with the present invention is employed;

Fig. 2 is a vertical central sectional view through a preferred embodiment of the controller;

Fig. 3 is a horizontal sectional view taken approximately on the line 3—3 of Fig. 2;

Fig. 4 is a fragmentary rear elevational view showing the central portion of the controller;

Fig. 5 is a fragmentary vertical sectional view taken approximately on the line 5—5 of Fig. 3;

Fig. 6 is a fragmentary vertical sectional view taken approximately on the line 6—6 of Fig. 3;

Fig. 7 is a diagrammatic view of a modified form of controller; and

Fig. 8 is a graphical view illustrating the action of the controller.

It will, of course, be understood that the description and drawings herein are illustrative merely, and that various modifications and changes may be made in the structure disclosed without departing from the spirit of the invention.

Referring more particularly to Fig. 1 of the drawings, a pneumatic circuit is shown diagrammatically for purposes of explanation of the invention. The pneumatic circuit includes a controller 10, a fluid connection 11 for the delivery of fluid at the measured pressure from a transmitter (not shown) operated by the variable condition and initiating or calling for a change in control conditions, a fluid connection 12 for the delivery of fluid at a controlled transmitted or valve operating pressure to a diaphragm operated valve 13, or the like, a fluid connection 14 to a source of pressure regulated and filtered fluid, such as air, a pilot valve 15 with high sensitivity and quick response to which the supply connection 14 is joined, a fluid pressure responsive mechanism M for indicating or recording, or both, a fluid connection 16 for the delivery of fluid at a control setting pressure, and a fluid connection 17 for the delivery of fluid at a reset pressure from any preferred source. Fluid connections 20 and 21 are also provided to the fluid responsive mechanism M from the measured pressure connection 11 and from the control setting pressure connection 16. Fluid connections 22 and 23 are also provided between the pilot valve 15 and the controller 10 and between the transmitted control pressure connection 12 and the controller 10.

The pilot valve 15 may be of any preferred type having the desired characteristics, such for example as that shown in my prior application for Letters Patent for Pneumatic Transmission Systems, filed July 29, 1942, Serial No. 452,760, now Patent No. 2,359,236, dated September 26, 1944.

The source of control setting pressure connected to the fluid connection 16 preferably includes a manually adjustable accurate type of pressure regulator (not shown).

The source of reset pressure may be of any preferred type, with automatic or manual adjustment, and is illustrated as a bleed type pressure regulator 18, connected to a pressure fluid supply line 24, and having a manually operated knob 25 for adjustment. A restriction 19 is provided in the connection 17 for regulation of the flow through the connection 17 in either direction as hereinafter pointed out.

The fluid pressure responsive mechanism M is preferably provided with a control setting index CI, responsive to the control setting pressure in the fluid connection 16, and a measured variable index MVI, responsive to the measured variable pressure in the fluid connection 12.

The controller 10, shown diagrammatically in Fig. 1 and in detail in Figs. 2, 3, 4, 5 and 6, preferably includes a casing having a central portion 30 and housings 31 and 32 disposed on opposite sides thereof and secured thereto in fluid tight relationship. Within the upper housing 31 spaced concentric bellows 35 and 36 are provided, secured in fluid tight relationship at their inner ends to the central portion 30 and closed at their outer ends by a suitable end closure member 37. Within the lower housing 32 spaced concentric bellows 38 and 39 are provided, secured in fluid tight relationship at their inner ends to the central portion 30 and closed at their outer ends by a suitable end closure member 40. The smaller bellows 36 and 39 preferably have the same effective areas, and the larger bellows 35 and 38 preferably have the same effective areas. The bellows end closures 37 and 40 are connected by a suitable connector 41 for simultaneous movement of the bellows assembly and in accordance with the resultant of the forces acting thereon.

A chamber 45 is thus provided within the interior of the bellows 36 and the bellows 39, having effective pressure areas $a_1$ and $a_2$ in opposite directions.

The chamber 45 is vented to the atmosphere through a passageway 46.

A pressure chamber 47 is provided in the space between the bellows 35 and the bellows 36, having an effective pressure area $a_3$, to which the control setting pressure connection 16 is connected, through passageways 48 and 49 in the central portion 30.

A pressure chamber 50 is provided in the space between the bellows 38 and the bellows 39, having an effective pressure area $a_4$, to which the measured variable pressure connection 11 is connected, through passageways 51 and 52 in the central portion 30.

A pressure chamber 55, having an effective pressure area $a_5$, is also provided in the space within the upper housing 31 and outside the bellows 35 with which the reset pressure connection 17 is in communication. The restriction member 19 which is employed with manual reset adjustment may be mounted in the central portion 30 with a central port 57 in communication with a passageway 56 connected to the pressure connection 17 with a restricted discharge port 58 of predetermined size in communication through passageways 59 and 60 with the chamber 55.

A pressure chamber 65, having an effective pressure area $a_6$, is also provided in the space within the housing 32 and outside the bellows 38 for purposes of control, and for application to the bellows assembly of a rebalancing pressure as hereinafter pointed out.

In the controller 10 shown in Figs. 2 to 6, inclusive, the sizes of the bellows 35, 36, 38 and 39 are preferably such that the areas $a_1$ and $a_2$ are equal, the areas $a_3$ and $a_4$ are equal and the areas $a_5$ and $a_6$ are equal. The relationship of the area $a_4$ to the area $a_6$ may be determined as desired and in accordance with the preferred upper limits of the throttling range provided in the controller 10, taking into account, of course, the full scale range of the measured variable pressure and the range of pressure required for full travel of the valve 13 effective on these areas.

The lower housing 32 has mounted therein a nozzle member 66 opening into the chamber 65 and with which the connection 22 to the pilot valve 15 is in communication. The nozzle member 66 has a passageway 67 and a restricted discharge port 68 of predetermined size. The bellows assembly, and preferably an extension of the connector 41, is provided with a flat control surface 69 for controlling the flow through the nozzle 66 and thereby actuating the pilot valve 15, as pointed out below.

In the central portion 30 a passageway 70 is provided leading from the chamber 55 to the chamber 65 and for connecting these chambers, and an adjustable needle valve 71 is provided in the passageway 70. The needle valve 71 is employed for adjusting the throttling range or sensitivity as hereinafter pointed out. The needle valve 71 is manually adjustable by means of a knob 72 and a dial 73 may be provided having thereon graduations (not shown) indicating the selected adjustment of the throttling range.

Before taking up the operation of the controller 10 in its various aspects it may be noted that the pilot valve 15 is intended for operation with a constant differential pressure maintained across the restricted discharge port 68 of the nozzle 66 so that the valve pressure transmitted by the pilot valve 15 is determined by the pressures effective on the bellows assembly and the positioning of the control surface 69 with respect to the discharge port 68. The use of a constant differential pressure across the nozzle orifice 68 substantially eliminates the nonlinear characteristics of the nozzle 66.

If the bellows assembly is moved, as hereinafter pointed out, so that the control surface 69 is initially brought closer to the port 68 or to a position to close the same the discharge through the port 68 is correspondingly initially reduced. The pressure in the nozzle passageway 67 and in the fluid connection 22 is thus increased and the pilot valve 15 is thereby actuated to increase the transmitted controlled valve pressure of the fluid in the connection 12 and in the fluid connection 23. This increased pressure is effective in the chamber 65 for rebalancing the bellows assembly so that the constant differential is maintained across the nozzle orifice 68 with a higher controlled valve pressure transmitted by the pilot valve 15. The bellows assembly is rebalanced for the changed conditions effective thereon substantially at its prior and initial position thereby virtually eliminating the nonlinear characteristics of the bellows 35, 36, 38 and 39.

Similarly if the bellows assembly is moved so that the control surface 69 is initially brought further away from the discharge port 68 the flow through the port 68 is correspondingly increased. The pressure effective through the fluid connection 22, is thus decreased and the pilot valve 15 is actuated to reduce the controlled valve pressure transmitted through the fluid connection 12 and delivered to the chamber 65 for rebalancing.

The mode of operation of the controller 10 will now be pointed out. It will be assumed that the control setting pressure fluid is applied through the fluid connection 16 and against the effective area $a_3$ in the chamber 55 and also to the pressure responsive mechanism M for operating the control index CI to position the same as desired and in accordance with the selected level of control setting pressure. Supply fluid is delivered through the fluid connection 14 to the pilot valve 15 and therefrom through the fluid connection 22 for discharge through the discharge port 68 of the nozzle 66 and at a predetermined pressure drop across the port 68. Pressure fluid is supplied from the pilot valve 15 through the fluid connection 12 and the fluid connection 23 to the chamber 65, as determined by the forces acting on the bellows assembly and the resultant positioning of the control surface 69. This pressure fluid is effective on the area $a_6$.

In the chamber 55, and effective on the area $a_5$, there is a throttling range pressure which is affected by the reset pressure delivered through the fluid connection 17 from the source of reset pressure and the pressure fluid, if any, passing the needle valve 71. The throttling range pressure is determined by the pressure drop across the restriction 19 for either direction of flow and the pressure drop across the needle valve 71 for either direction of flow and will be in a range between the valve pressure and the reset pressure, and irrespective of which is higher.

The measured variable pressure is applied through the fluid connection 11 in the chamber 50 where it is effective on the area $a_4$, and also through the fluid connection 20 to the pressure responsive mechanism M for positioning the measured variable index MVI.

The bellows assembly thus provides structure for simultaneously balancing four pressures. Variations in any of the throttling range pressure, the control setting pressure and the measured variable pressure are balanced by the controlled valve pressure.

The controller 10 will provide a throttling type of control by a controlled valve pressure transmitted to the valve 13 responsive to changes in the measured variable pressure effective through the fluid connection 11 and in the chamber 50.

Assuming that the bellows assembly is in an equilibrium position determined by the resultant of the pressures acting thereon, upon an increase in the measured variable pressure in the fluid connection 11 the increased pressure thereupon effective in the chamber 50 will tend to move the bellows assembly downwardly and bring the control surface 69 closer to the discharge port 68 of the nozzle 66. This in turn causes the pilot valve 15 to transmit an increased controlled valve pressure which is effective in the chamber 65 for repositioning the bellows assembly and may immediately or thereafter be effective in the chamber 55, in accordance with the setting of the needle valve 71, as hereinafter pointed out. Similarly upon a decrease in the measured variable pressure effective in the fluid connection 11 the decreased pressure effective in the chamber 50 tends to permit the control surface 69 to move further away from the discharge port 68 thereby decreasing the controlled valve pressure transmitted by the pilot valve 15 and delivered to the chamber 65 for repositioning the bellows assembly subject, however, to the setting of the needle valve 71.

The magnitude of the throttling action is manually adjustable to suit the requirements of the variables to be controlled and this is effected by adjustments of the needle valve 71.

If the needle valve 71 is fully open, so that it does not offer any appreciable resistance to the flow of fluid therethrough, then a slight change in the measured variable pressure applied through the fluid connection 11 and in the chamber 50 will result in full range change of pressure transmitted by the pilot valve 15. This would theoretically result in zero throttling range or on-off control conditions. In practice, the slight resistance at the needle valve 71 provides an effective throttling range of one or two percent.

If the needle valve 71 is fully open the throttling range pressure in the chamber 55 is practically the same as the controlled valve pressure.

If the needle valve 71 is fully closed then the pressure prevailing in the chamber 55 is constant at the reset pressure delivered through the fluid connection 17 and is unaffected by changes in the rebalancing or controlled valve pressure. Under these conditions the throttling range is dependent only upon the relationship of the full scale operating pressure range of the control valve 13 to the full scale transmitted pressure range of the measured variable, and the ratio of the areas $a_5$ and $a_4$ on which the controlled valve pressure and measured variable pressure are effective.

The selection of the desired throttling range may be readily accomplished by adjustment of the needle valve 71 between the limits of fully open and fully closed. The dial 73 of the needle valve 71 may be calibrated directly in percent throttling range.

If the needle valve 71 is set at a desired position between the limits thereof, to provide a particular selected throttling range, if the control setting pressure is adjusted so that the control setting pressure is applied as desired in the chamber 47, if the regulator 18 is set as desired, then for a given measured variable pressure in the fluid connection 11 and in the chamber 50 the control surface 69 will occupy a particular relationship with respect to the discharge port 68 of the nozzle 66 and a predetermined controlled valve pressure will be transmitted by the pilot valve 15 and available in the fluid connection 12 and in the chamber 65. The bellows assembly will be in a balanced condition. The throttling range pressure in the chamber 55 will have a value determined by the pressure conditions beyond the restriction 19 and beyond the needle valve 71. Fluid may flow in either direction past the pilot valve 71 or the restriction 19 dependent upon the respective pressures in the connection 17 and in the chamber 55.

If, then, the measured variable pressure increases, such increase will tend initially to move the bellows assembly downwardly so that the control surface 69 is initially moved closer to the discharge port 68 of the nozzle 66 and the pressure transmitted by the pilot valve 15 is increased. This increase in pressure is immediately effective in the chamber 65 and on the area $a_6$ for repositioning the bellows assembly. If the increased rebalancing or valve pressure in the chamber 65 is greater than the throttling range pressure in the chamber 55 then pressure fluid will bleed past the needle valve 71 and into the chamber 55 in a manner such that it will modify the throttling range pressure in the chamber 55. If the throttling range pressure in the chamber 55 exceeds the reset pressure from the regulator 18, fluid may exhaust past the restriction 19 and through the fluid connection 17 and the regulator 18. If the increased rebalancing or valve pressure in the chamber 65, although increased, is less than the throttling range pressure in the chamber 55 then pressure fluid will bleed past the needle valve 71 and into the chamber 65 in a manner such that it will modify the throttling range pressure in the chamber 55. The regulated leveling of the throttling range pressure in the chamber 55 is determined by the setting of the needle valve 71. The bellows assembly is positioned in accordance with the resultant of the forces acting thereon to a balanced position with transmission from the pilot valve 15 of the increased controlled valve pressure required by the increase in the measured variable pressure.

If the measured variable pressure decreases, such decrease will tend initially to move the bellows assembly upwardly so that the control surface 69 is initially moved further away from the discharge port 68 and the pressure transmitted through the fluid connection 12 and effective in the chamber 65 is decreased and permits of the repositioning of the bellows assembly. Pressure fluid also tends to leak past the needle valve 71 in a direction dependent upon the pressure conditions prevailing in the chamber 55 and in the chamber 65, and in a manner such that it will modify the throttling range pressure in the chamber 55. The bellows assembly is positioned in accordance with the resultant of the forces acting thereon to a balanced position with transmission from the pilot valve 15 of the decreased controlled valve pressure required by the decrease of the measured variable pressure.

The bellows assembly is capable of assuming a number of positions of balance in accordance with the resultant of the forces acting thereon, but, by reason of the use of the pilot valve 15, the difference in position of the control surface 69 with respect to the discharge port 68 for various equilibrium conditions upon rebalancing or repositioning will be very small and of the order of a few thousandths of an inch.

If the conditions of the process change and these changed conditions continue for an appreciable length of time and necessitate or render desirable change of control conditions at values different from normal the throttling range pressure may be adjusted manually as desired by the knob 25 on the pressure regulator 18. The adjustment of the pressure regulator 18 to a higher or lower value changes the throttling range pressure in the chamber 55, and the controlled valve pressure in the chamber 65 and transmitted through the fluid connection 12.

The adjustment of the control point is similarly effected by adjustment of the control setting pressure effective in the chamber 47.

In the foregoing description it has been assumed that an increase in transmitted pressure is desired upon an increase in the measured variable pressure. If the reverse is desired, that is, a decrease of transmitted pressure is desired upon an increase in the measured variable pressure this may be readily accomplished by interchanging the measured variable pressure and control setting pressure connections 11 and 16 and this will not change any of the other factors involved.

It will be noted that the control point, the throttling range and the manual reset may be independently adjusted without affecting each other. Since there is no fluid connection between the measured variable pressure, the control setting pressure and the throttling range pressure, changes in any of these are balanced at the bellows assembly by changes in the rebalancing or controlled valve pressure.

In the modified form of the controller 10a shown diagrammatically in Fig. 7, provision is made for a higher throttling range than that available in the controller 10 shown in Figs. 2 to 6, inclusive. The controller 10a illustrated in Fig. 7 includes a casing having a central portion 30 with an upper housing 31 and a lower housing 32 secured thereto in fluid tight relationship. Within the upper housing 31 spaced concentric bellows 35 and 36a are provided, secured in fluid tight relationship at their inner ends to the central portion 30 and closed at their outer ends by a suitable end closure member 37. Within the lower housing 32 spaced concentric bellows 38 and 39a are provided, secured in fluid tight relationship at their inner ends to the central portion 30 and closed at their outer ends by a suitable end closure member 40. The larger bellows 35 and 38 preferably have the same effective area and the smaller bellows 36a and 39a preferably have different effective areas, the relationship between the areas of the respective bellows being referred to below. The bellows end closures 37 and 40 are connected by a connector 41 for simultaneous movement of the bellows assembly in accordance with the resultant of the forces acting thereon.

A chamber 47a is provided in the space between the bellows 35 and the bellows 36a and in the space between the bellows 38 and the bellows 39a, the spaces being connected by a passageway 75 in the central portion 30. This chamber 47a will have an effective pressure area $a_3$ equal to the difference between the difference of area of the bellows 35 and the bellows 36a and between the difference of area of the bellows 38 and the bellows 39a. The control setting pressure connection 16 is connected to the chamber 47a.

A chamber 50a is provided in the interior of the bellows 36a and the bellows 39a, having an effective pressure area equal to the difference of the effective areas of the bellows 39a and the bellows 36a and which may be referred to as $a_4$. The measured variable pressure connection 11 is connected to the chamber 50a.

A chamber 55 having an effective pressure area $a_5$ is provided in the space within the upper housing 31 and outside the bellows 35 with which the reset pressure connection 17 is in communication through a restriction 19 for aiding in setting up the throttling range determining effect.

A pressure chamber 65 having an effective pressure area $a_6$ is also provided in the space within the housing 32 and outside the bellows 38 for application to the bellows assembly of the controlled valve pressure from the pilot valve 15 for rebalancing. The sizes of the bellows 35, 36a, 38 and 39a may be selected in any desired relationship and a higher throttling range will thereby be made available.

The lower housing 32 has mounted thereon a nozzle member 66 having a restricted discharge port 68 controlled by the control surface 69. The connection 22 from the pilot valve 15 to the nozzle 66 is provided for the control of the pilot valve 15 and the connection 23 is provided for the delivery of fluid to the chamber 65 for rebalancing.

The bellows assembly has a control surface 69 for cooperation with the discharge port 68 of the nozzle 66 as heretofore pointed out.

The chamber 65 and the chamber 55 are connected by a passageway 70 in the central body portion 30, and an adjustable needle valve 71 is provided in the passageway 70 for adjusting the throttling range or sensitivity.

The operation of the controller 10a is substantially the same as that of the controller 10. The bellows assembly is positioned by the resultant of the forces acting thereon and controls the pilot valve 15. The controlled valve pressure determined by the positioning of the bellows assembly is effective in the chamber 65 for repositioning the bellows assembly and is transmitted by the pilot valve 15. The adjustment of the needle valve 71 determines the regulated leveling of the throttling range pressure in the chamber 55 and thereby the specific throttling range.

The characteristics of the apparatus are illustrated graphically in Fig. 8 which shows transmitted controlled valve pressure values as the abscissas and measured variable pressure values as the ordinates. The zero percent throttling range line $r_1$ is horizontal, showing full change of transmitted pressure upon an infinitely small change in measured variable pressure. The line $r_5$ representing 300 percent throttling range shows a large change in measured variable pressure necessary to provide a small change of transmitted pressure. The lines $r_2$, and $r_3$ and $r_4$ show smaller changes. A family of curves is available at other throttling ranges. The entire family of curves can be moved vertically without changing their interrelationship by manually varying the control setting pressure and thereby adjusting the control point $cp$ vertically. The entire family of curves can also be moved horizontally without changing their interrelationship by manually or otherwise varying the reset pressure and thereby adjusting the control point $cp$ horizontally.

I claim:

1. In fluid pressure control apparatus, the combination of a source of fluid under pressure, fluid pressure responsive means for controlling the pressure of the fluid supplied from said source, said pressure responsive means including a movable member having a portion actuated by a measured variable pressure and another pressure responsive portion, a second source of fluid under controlled pressure, means for supplying fluid under pressure from said second source through a restriction against said other responsive portion, means for applying fluid at the controlled pressure from said first source for rebalancing said movable member at an equilibrium position, and adjustable means for further modifying the effect of said measured variable pressure, said adjustable means including fluid connections for determining the pressure applied against said other pressure responsive portion in a range between the controlled pressure from said first source and the controlled pressure from said second source.

2. In fluid pressure control apparatus, the combination of a source of fluid under pressure, fluid pressure responsive means for controlling the pressure of the fluid supplied from said source, said pressure responsive means including a movable member having a pressure responsive portion actuated by a measured variable pressure and another pressure responsive portion connected thereto, a second source of fluid under controlled pressure, means for supplying fluid under pressure from said second source and against said other responsive portion for modifying the effect of the measured variable pressure on said movable member, means for applying fluid at the controlled pressure from said first source on said movable member, and adjustable means for further modifying the effect of said measured variable pressure, said last means including means for applying on said movable member fluid at a pressure in the range between the controlled pressure supplied from said first source and the controlled pressure supplied from said second source and in opposition to the other controlled pressure supplied from said first source.

3. In pressure fluid control apparatus, the combination of a source of fluid under pressure, fluid pressure responsive means for controlling the pressure of the fluid supplied from said source, said pressure responsive means including a movable member having a pressure responsive portion actuated by a measured variable pressure and a second pressure responsive portion connected thereto, a second source of fluid under controlled pressure, and adjustable means for regulating the application of fluid pressure to said second pressure responsive portion from said second source and from said first source in accordance with the preponderant pressure.

4. In fluid pressure control apparatus, the combination of a first source of fluid under pressure, fluid pressure responsive means for controlling the pressure of the fluid from said first source, a second source of fluid under pressure, said pressure responsive means including a body portion having two spaced concentric bellows mounted therein at their inner ends and closed at their outer ends to provide an interior chamber therebetween responsive to an adjustable fixed pressure and an exterior chamber, fluid connections including a bleed and a restriction between said second source and said exterior chamber, two other spaced concentric bellows mounted at their inner ends in said body portion and closed at their outer ends to provide an interior chamber therebetween responsive to a measured variable pressure and an exterior chamber responsive to the controlled pressure from said first source, said other bellows being alined with said first bellows and oppositely disposed and the outer ends of said bellows being connected for simultaneous movement, and fluid connections including an adjustable valve member between said exterior chambers whereby the pressure in said first exterior chamber is applied in a range between the pressure of the fluid from said second source and said controlled pressure.

5. In fluid pressure control apparatus, the combination of a source of fluid under pressure, pressure transmitting means connected to said source for supplying pressure fluid at a controlled pressure, fluid pressure responsive means for controlling said pressure transmitting means, said pressure responsive means including a movable portion responsive to a measured variable pressure, a movable portion responsive to a control setting pressure, a movable portion responsive to a throttling range determining pressure, and a movable portion responsive to the controlled pressure from said pressure transmitting means, said movable portions being connected for simultaneous movement, and means for varying the pressure on the movable portion responsive to throttling range pressure including an adjustable fluid connection between said pressure transmitting means and said movable portion and a connection to a separate source of fluid under a controlled pressure.

6. In fluid pressure control apparatus, the combination of a source of fluid under pressure, pressure transmitting means connected to said source for supplying pressure fluid at a controlled pressure, fluid pressure responsive means for controlling said pressure transmitting means, said pressure responsive means including a movable portion responsive to a measured variable pressure, a movable portion responsive to a control setting pressure, a movable portion responsive to a throttling range determining pressure, and a movable portion responsive to the controlled pressure from said pressure transmitting means, said movable portions being connected for simultaneous movement, a separate source of fluid under controlled pressure, and means for maintaining the throttling range determining pressure in a range between the pressure effective from said separate source and the controlled pressure from said first source.

7. In fluid pressure control apparatus, the combination of a source of fluid under pressure, pressure transmitting means connected to said source for supplying pressure fluid at a controlled pressure, fluid pressure responsive means for controlling said pressure transmitting means, said pressure responsive means including a movable portion responsive to a measured variable pressure, a movable portion responsive to a control setting pressure, a movable portion responsive to a throttling range determining pressure, and a movable portion responsive to the controlled pressure from said pressure transmitting means, said movable portions being connected for simultaneous movement, and means for varying the level of said throttling range determining pressure including a separate source of fluid under controlled pressure.

8. In fluid pressure control apparatus, the combination of a source of fluid under pressure, pressure transmitting means connected to said source for supplying pressure fluid at a controlled pressure, fluid pressure responsive means for controlling said pressure transmitting means, said pressure responsive means including a movable portion responsive to a measured variable pressure, a movable portion responsive to a control setting pressure, a movable portion responsive to a throttling range determining pressure, and a movable portion responsive to the controlled pressure from said pressure transmitting means, said movable portions being connected for simultaneous movement, and manually adjustable means for regulating said throttling range determining pressure including a separate source of fluid under controlled pressure.

9. In fluid pressure control apparatus, the combination of a source of fluid under pressure, fluid pressure responsive means for controlling the pressure supplied from said source, said fluid pressure responsive means including a movable portion responsive to a measured variable pressure and another movable portion connected thereto for simultaneous movement therewith, a second source of fluid under pressure, and adjustable means for varying the sensitivity of said movable portions, said means including a chamber formed in part by said other movable portion and a connection from said chamber through a restriction to said second source of fluid under pressure and a variable connection from said chamber to the controlled pressure fluid supplied from said first source.

10. In fluid pressure control apparatus, the combination of a source of fluid under pressure, fluid pressure responsive means for controlling the pressure of the fluid from said source, said pressure responsive means including a movable member having a pressure responsive portion actuated by a measured variable pressure and another pressure responsive portion connected thereto for simultaneous movement therewith, and means for applying fluid pressure in a predetermined range against said other pressure responsive portion, said last means including a second source of fluid under controlled pressure, and a fluid connection having a variable restriction for access of controlled pressure fluid from said first source effective against said other pressure responsive portion.

11. In fluid pressure control apparatus, the combination of a source of fluid under pressure, fluid pressure responsive means for controlling the pressure of the fluid from said source, said fluid pressure responsive means including a movable portion responsive to a measured variable pressure, and means for modifying the action of said fluid pressure responsive means including an additional source of fluid under controlled pressure and means for applying pressure fluid against said pressure responsive means in a controlled range between the controlled pressure from said first source and the controlled pressure of the fluid from said second source.

12. In fluid pressure control apparatus, the combination of a source of fluid under pressure, fluid pressure responsive means for controlling the pressure of the fluid from said source, said pressure responsive means including a movable portion responsive to a measured variable pressure and another movable portion connected to said first movable portion for movement therewith, a second source of fluid under controlled pressure, means for changing the effect of the measured variable pressure including a connection to said second source and an adjustable connection to the controlled pressure fluid from said first source for supplying fluid under pressure in a predetermined range against said other movable portion for changing the effect of the measured variable pressure, and means for applying pressure fluid at the controlled pressure from said first source for rebalancing said movable portions at equilibrium positions.

13. In fluid pressure control apparatus, the combination of a first source of fluid under pressure, fluid pressure responsive means for controlling the pressure of the fluid supplied from said first source, a second source of fluid under controlled pressure, said pressure responsive means including a body portion having two spaced concentric bellows mounted therein at their inner ends and closed at their outer ends to provide an interior chamber therebetween responsive to an adjustable fixed pressure and an exterior chamber, fluid connections including a restriction between said second source and said exterior chamber, two other spaced concentric bellows mounted at their inner ends in said body portion and closed at their outer ends to provide an interior chamber therebetween responsive to a measured variable pressure and an exterior chamber responsive to the controlled pressure from said first source for rebalancing said pressure responsive means at an equilibrium position, fluid connections including an adjustable valve between said exterior chambers for effecting the application in said first exterior chamber of fluid at a pressure in a range between the pressure of the fluid from said second source and the controlled pressure from said first source, said other bellows being alined with said first bellows and oppositely disposed and the outer ends of said bellows being connected for simultaneous movement.

14. In fluid pressure control apparatus, the combination of a source of fluid under pressure, fluid pressure responsive means for controlling the pressure of fluid from said source, said pressure responsive means including a movable portion responsive to a measured variable pressure and another movable portion connected to said first movable portion for movement therewith, a second source of fluid under controlled pressure in communication with said other movable portion, means for supplying fluid under pressure against said other movable portion in the range between the pressure from said second source and the controlled pressure from said first source, and means for applying pressure fluid at the controlled pressure from said first source for rebalancing said movable portions substantially at their initial positions.

15. In fluid pressure control apparatus, the combination of a source of fluid under pressure, fluid pressure responsive means for controlling the pressure of the fluid from said source, said pressure responsive means including a movable portion responsive to a measured variable pressure and another movable portion connected to said first movable portion for movement therewith, a second source of fluid under controlled pressure, means for applying fluid under pressure against said other movable portion in a range between the pressure of the fluid from said second source and the controlled pressure from said first source, said last means including an adjustable valve member, and means for applying pressure fluid at the controlled pressure from said first source for rebalancing said movable portions substantially at their initial positions.

16. In fluid pressure control apparatus, a source of fluid under pressure, pressure transmitting means connected to said source for transmitting a controlled fluid pressure, fluid pressure responsive means for controlling said pressure transmitting means, said pressure responsive means including a fluid pressure responsive member, means for applying a measured variable pressure against a portion of said member, means for applying said controlled fluid pressure against a second portion of said member in one direction, and means for supplying a pressure continuously changeable in direct proportion to variations in said controlled pressure, said responsive member having a third portion against which said changeable pressure is effective, said supplying means including a second source of fluid under pressure and a plurality of restrictions one of which is adjustable for modifying the proportionality between changes of the pressures effective on said second and said third portions, and one of which is interposed between said second source and said third portion.

17. In fluid pressure control apparatus, a source of fluid under pressure, pressure transmitting means connected to said source for transmitting a controlled fluid pressure, fluid pressure responsive means for controlling said pressure transmitting means, said pressure responsive means including a fluid pressure responsive member having a neutral position, a connection to a measured variable, means for displacing said pressure responsive member from the neutral position upon a change of said measured variable, means responsive to the controlled pressure for restoring said pressure responsive member to the neutral position upon a change in the controlled pressure, a second source of fluid under pressure, fluid pressure connections provided with a plurality of restrictions, one of said restrictions being in communication with the pressure transmitting means and one of said restrictions being in communication with said second source, one of said restrictions being adjustable, said connections and restrictions providing with said second source a fluid pressure proportional to said controlled pressure, and fluid pressure connections for applying said proportional pressure against a portion of said pressure responsive member in opposition to the controlled pressure.

COLEMAN B. MOORE.

REFERENCES CITED

The following references are of record in the file of this patent:

UNITED STATES PATENTS

| Number | Name | Date |
|---|---|---|
| 2,098,914 | Gorrie | Nov. 9, 1937 |
| 2,290,987 | Moore | July 28, 1942 |
| 2,302,014 | Fausek | Nov. 17, 1942 |
| 2,356,970 | Brockett | Aug. 29, 1944 |

FOREIGN PATENTS

| Number | Country | Date |
|---|---|---|
| 421,815 | Great Britain | Jan. 1, 1935 |